Aug. 24, 1965  P. T. FAXÉN  3,202,019
VARIABLE SPEED RATIO TRANSMISSION
Filed April 2, 1963  5 Sheets-Sheet 1

Fig. 1.

Per Torsten Faxén

Fig. 4.

United States Patent Office 3,202,019
Patented Aug. 24, 1965

3,202,019
VARIABLE SPEED RATIO TRANSMISSION
Per Torsten Faxén, Jonkoping, Sweden, assignor to Svenska Aeroplan Aktiebolaget, Linkoping, Sweden, a corporation of Sweden
Filed Apr. 2, 1963, Ser. No. 270,510
7 Claims. (Cl. 74—796)

This invention relates to variable speed ratio transmissions, and refers more particularly to adjustable speed change apparatus of the type that provides a continuously variable range of speed ratios between a rotatable driving member and a rotatable driven member.

Certain requirements can be said to be essential in variable ratio transmissions that provide a continuously adjustable range of speeds, as for example reliability, low cost, good efficiency, and small volume and weight per rated horsepower of the transmission. In addition, such transmissions should also incorporate certain other characteristics that are desirable, and some of which are related to the essentials just mentioned. Examples of these desiderata are: large range of speed ratios, reversibility, quiet and vibrationless operation, large maximum moment for the driven member, insensitivity to temperature variations, and a minimum number of parts that are subject to wear, such parts being preferably simple and easily replaceable.

The present invention has as its general object the provision of a variable ratio transmission that provides a continuously adjustable range of speed ratios, wherein the above mentioned desiderata are met to a substantial extent, and wherein, in contrast to prior devices of this type, the requirements for small volume and low weight are also satisfied, so that the transmission of this invention is particularly suitable for aircraft and motor driven vehicles.

In general the invention resides in providing a transmission of the character described having rotatable driving and driven members, one of which has a flat or calotte shaped friction surface normal to its axis of rotation and the other of which comprises a rotor, said members being so mounted that their rotational axes are parallel but that one of the members is adjustably movable relative to the other in opposite directions of translation whereby its axis is carried toward and from that of said other, wherein the rotor carries a plurality of circumferentially spaced apart roller elements which are engaged with the frictional surface to transfer torque from one of the rotatable members to the other, and wherein means are provided for so orienting the rolling axis of each roller element, in every part of the orbit in which it is carried by the rotor, as to provide a maximum of torque transmission and a minimum of sliding friction between the members.

More specifically it is an object of this invention to provide a transmission of the character just described wherein the rolling axis of each roller element is disposed parallel to the direction of motion of the friction surface at that point in the orbit of the roller element where its direction of motion most nearly coincides with that of the point on the friction surface that it is engaging, and wherein said rolling axis is disposed substantially perpendicular to the direction of motion of the friction surface, to permit the roller element to roll substantially freely thereover, in that portion of the roller element orbit in which its direction of motion differs most from that of the point on the friction surface that the roller is then contacting.

In more detail, it is an object of this invention to provide simple means, in a transmission of the character described, for so orienting each roller element on the rotor that its plane of symmetry at any instant is parallel to the vector corresponding to the resultant of the vectors which respectively designate the orbital motion of the roller at that instant and the relative motion at the same instant of the point on the friction surface that the roller is then engaging.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of the physical embodiments of the invention constructed according to the best modes so far devised for the practical application of the principles thereof, and in which.

Figure 1:
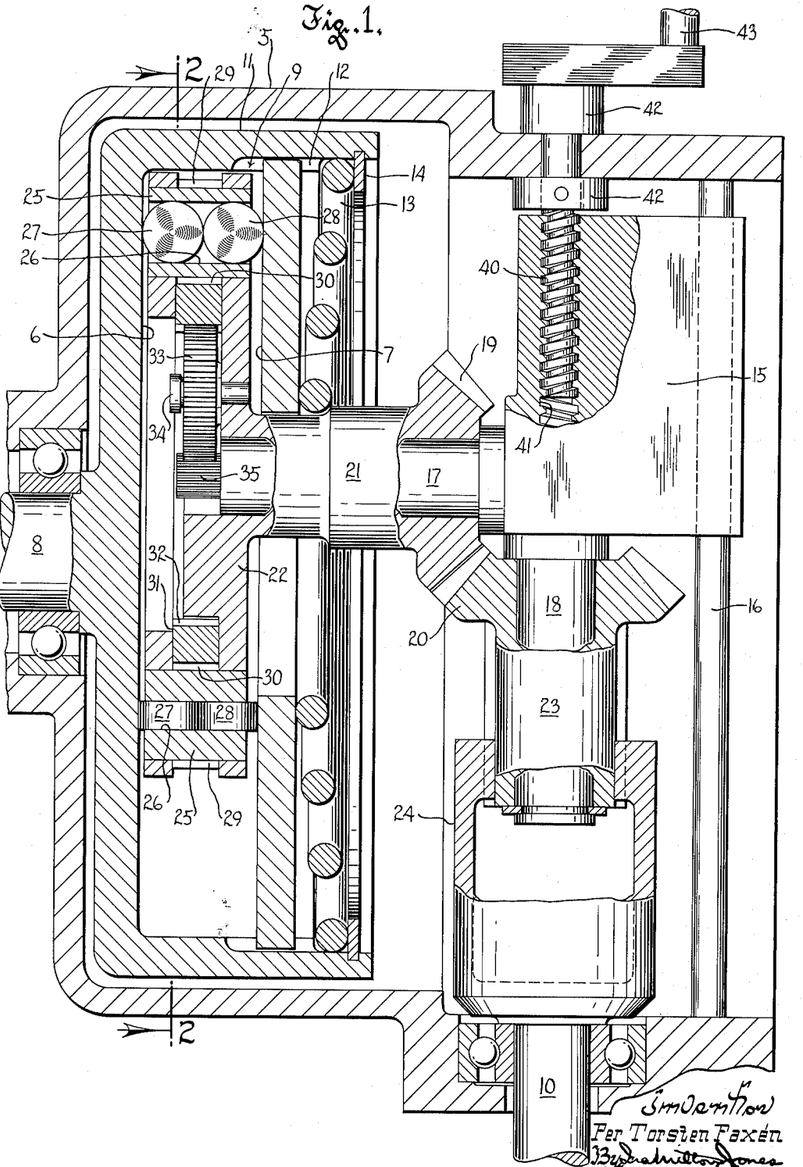
FIGURE 1 is a longitudinal sectional view of a variable speed ratio transmission embodying the principles of this invention.
Figure 2:
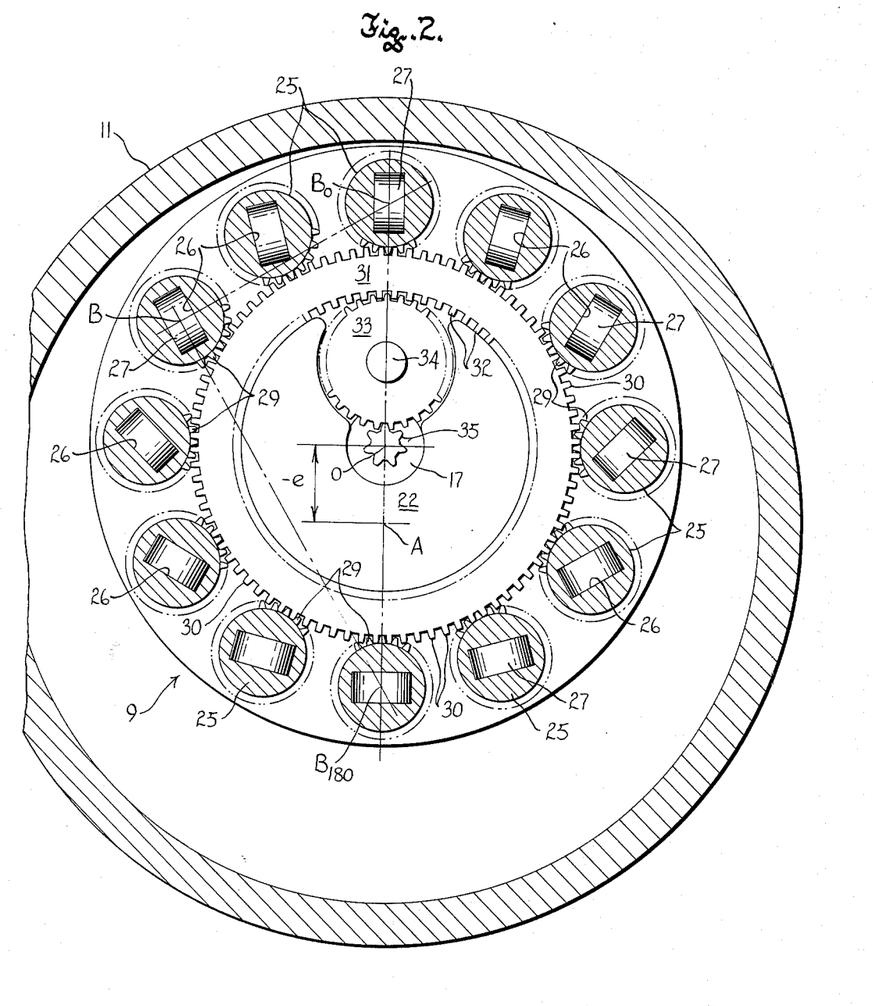
FIGURE 2 is a cross-sectional view taken on the plane of the line 2—2 in FIGURE 1.

Referring now to the accompanying drawings, and particularly to FIGURES 1 and 2, the variable ratio transmission of this invention comprises, in general, a rigid frame or housing 5 in which there are housed a pair of friction plates 6 and 7, coaxially secured to a shaft 8 that is rotatably journaled in the housing, and a rotor 9 disposed between the friction plates and having a torque transmitting connection with another shaft 10 that is journaled in the housing. In this case the shaft 8, which projects forwardly out of the housing, is assumed to constitute the input or driving member of the apparatus, and the shaft 10, which projects out of the housing to one side thereof, is considered the driven or output shaft. However, this relationship could be reversed if desired.

One of the friction plates 6 comprises the front wall of a rearwardly opening cup-shaped member 11 that is coaxially secured to the input shaft 8 for rotation therewith, the rear face of said wall being flat and normal to the rotational axis of the member and providing a friction surface. The other friction plate 7 is annular and is received within the cylindrical side wall of the cup-shaped member 11, near the rear edge thereof. The annular rear friction plate 7 has a splined connection 12 with the side wall of the cup-shaped member 11, by which connection the friction plate 7 is constrained to rotate coaxially with the cup-shaped member. The front face of the friction plate 7 comprises its friction surface.

A helical compression spring 13, reacting against a split washer 14 received in an inwardly opening circumferential groove in the side wall of the cup-shaped member, engages the rear face of the friction plate 7 to yieldingly urge said plate forwardly.

The rotor 9, which is confined between the friction plates 6 and 7, and which rotates on an axis that is at all times parallel to the axis of the friction plates, is carried by a carriage 15 that is slidable on parallel rails 16 which extend transversely to the rotor axis. Projecting from the carriage at right angles to one another are a pair of fixed shafts 17 and 18, the shaft 17 extending forwardly from the carriage, through the hole in the rear friction plate 7, and having its axis parallel to the driving shaft 8, and the shaft 18 extending sidewardly from the carriage, parallel to the rails 16, and being coaxial with the output shaft 10. Journaled on the fixed shafts 17 and 18 respectively are meshing bevel gears 19 and 20. The bevel gear 19 has a sleeve portion 21 which projects forwardly through the hole in the annular rear friction plate 7 and which terminates at its front end in a coaxial radial enlargement that provides the body 22 of the rotor. The other bevel gear 20 has a sidewardly extending sleeve portion 23 which is splined to a cup-shaped inward extension 24 of the output shaft 10. Hence, in any position of the carriage, rotation is transmitted, at an unvarying speed ratio, between the rotor body 22 and the output shaft 10, through the bevel gears 19 and 20.

Adjusting bodily movement of the carriage 15 along the rails 16 effects variation of the ratio of input to output shaft speeds, as explained hereinafter, and can be provided for in any suitable manner. As shown, a screw 40 is rotatably journaled in the frame and is engaged in a mating threaded hole 41 in the carriage that extends parallel to the rails 16. Collars 42 on the screw coact with the frame to hold the screw against axial movement, and a crank handle 43 on the outer end of the screw facilitates manual adjustment thereof. It will be noted that the range of carriage travel in the embodiment of the invention shown in FIGURE 1 is limited by the size of the hole in the rear friction plate 7 and the diameter of sleeve portion 21 of bevel gear 19, which extends therethrough.

A plurality of sleeve-like roller carriers 25 are mounted in the rotor body 22 for rotation relative thereto on axes which are parallel to the rotor axis and which are radially equidistant therefrom and circumferentially spaced from one another, preferably by equal distances. Each of the roller carriers has an axial hole or bore 26 therethrough that is rectangular in cross section, and in this bore a pair of cylindrical or slightly drum-shaped roller elements 27 and 28 are received with their axes normal to that of the roller carrier. The rotor body 22, the roller carriers 25 and the roller elements which they carry, together comprise the rotor 9.

The rollers 27 and 28 fit the carrier 25 loosely enough so that they can roll freely, but closely enough to be confined by the carrier against substantially all motion transverse to the roller carrier axis. The forward roller 27 of each pair peripherally engages the front friction plate 6, while the rear roller 28 similarly engages the rear friction plate 7, such engagement being maintained by the forward biasing force which the spring 13 exerts upon the rear friction plate, whereby the two rollers of each pair are also maintained in rolling peripheral contact with one another within the carrier.

Each of the roller carriers 25 is caused to rotate about its axis, relative to the rotor body, in such a manner that in every part of its orbit it maintains a particular orientation of the axes of the roller elements that it carries, as explained in detail hereinafter. To effect such rotation each roller carrier is provided with external gear teeth 29 around its medial portion (see FIGURE 2) which mesh with external teeth 30 on a ring gear 31 that is carried by the rotor body for coaxial rotation relative thereto. The ring gear 31 also has internal teeth 32 that mesh with a pinion 33 which is freely rotatable on a stud 34 fixed in the rotor body. The rotational axis of the pinion 33 is parallel to and spaced from the rotor axis, and the pinion also meshingly engages stationary gear teeth 35 formed on the front end of the forwardly projecting fixed shaft 17. Hence the fixed teeth 35 cause the pinion to rotate on its axis in consequence of its being carried orbitally by the rotor, and through the ring gear 31 the pinion imparts rotation to the several roller carriers.

It is important that the ratios of the gear train 35, 33, 31 and 29 be so chosen that each roller carrier rotates through exactly one-half a revolution (180°) each time it is carried through a full 360° orbit with the rotor body, the direction of rotation of the roller carrier relative to the rotor being opposite to the direction of rotor rotation. It is also important that the axes of the roller elements carried by each roller carrier be properly oriented throughout the orbit of the carrier, although it will be apparent that if proper orientation of the roller carrier is achieved at any one point in its orbit, its proper orientation throughout the remainder of its orbit will be obtained as a matter of course provided the proper two-to-one ratio of rotor to roller carrier speeds has been established.

Specifically, there is one point in the orbit of each roller carrier—which point is the same for all of the roller carriers—at which the carrier should be so disposed that the axes of the roller elements that it carries are exactly parallel to a tangent to the roller carrier orbit at that point. The point just mentioned is hereinafter sometimes referred to as the positive pole, and is the point in the roller carrier orbit at which the axis of the roller carrier lies on a plane through the axes of the rotor and of the friction plates. At that point in the orbit of each roller carrier 25 its velocity vector is identical with that of the parts of the friction plates that its rollers are then engaging. With the axes of the rollers oriented as just described (i.e., normal to the plane on which the positive pole lies), the rollers have the maximum ability to transmit torque from the friction plates 6 and 7 to the rotor body 22 because the rollers are then so disposed as to produce a maximum of friction torque between the rotor and the friction plates.

Directly opposite (i.e., 180° of orbit) from the positive pole, each roller carrier passes through a point in its orbit at which the axes of its rollers should be exactly perpendicular to a tangent to the roller carrier orbit at that point, and which point can be designated the negative pole. At the negative pole the relative motion between each roller element and the point on the frictional plate that it is then engaging is at its maximum, but because of the orientation of the roller axes as each carrier passes through the negative pole, its rollers have purely rolling engagement with the friction plates, i.e. transmit no friction force.

Note that the two poles are located exactly on the plane defined by the axes of the frictional plates and of the rotor, and are at opposite sides of the rotor axis and equidistant therefrom. As can be seen from FIGURE 2, the rate of rotation of the roller carriers relative to the rotor is such that in every part of the orbit of each roller carrier the axes of the rollers carried thereby intersect the positive pole, and the plane of symmetry of the rollers intersects the negative pole.

Figure 3:
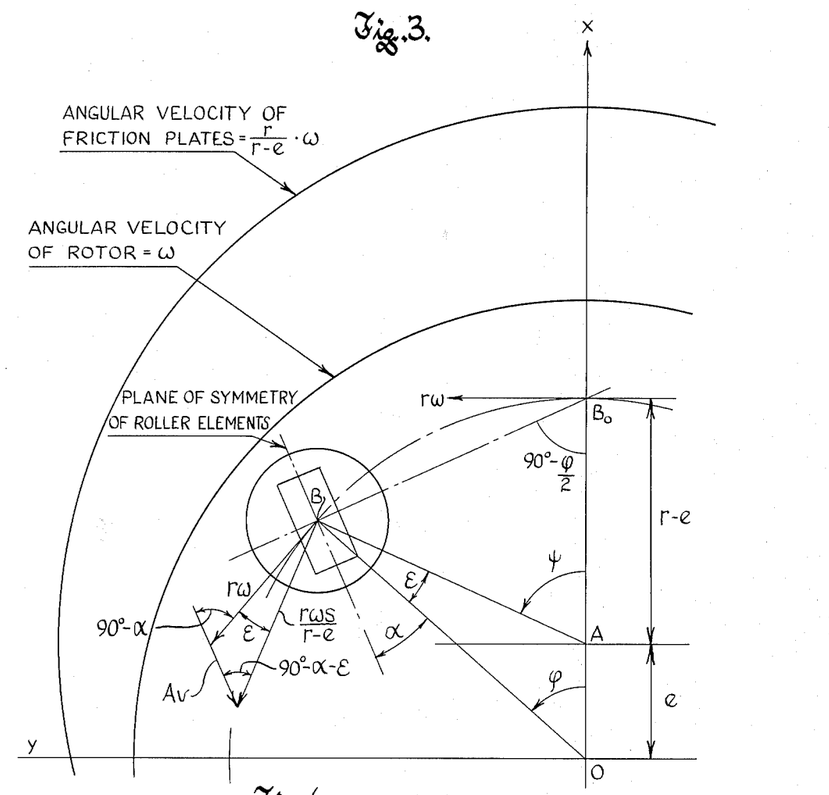
FIGURE 3 is a diagrammatic view corresponding very generally to FIGURE 2, illustrating the theory of the device.

Referring now more particularly to FIGURES 2 and 3, the following notations are employed in explaining the operation of the apparatus:

$O$ = origin = the point at which the rotor axis intersects a plane which is normal to the rotor axis and which lies in the rotor body (the $xy$ plane)

$A$ = the point at which the axis of the friction plates intersects the $xy$ plane $B$ = the point at which the rotation axis of a roller carrier intersects the $xy$ plane $B_0$ = the point at which a roller carrier axis intersects the $xy$ plane when $\phi = 0°$; i.e., the positive pole of the rotor $B_{180}$ = the point at which a roller carrier axis intersects the $xy$ plane when $\phi = 180°$; i.e., the negative pole of the rotor $r$ = the distance $OB$ $e$ = the distance $OA$; herein sometimes referred to as the eccentricity of the rotor (taken as negative when the rotor is in the position shown in FIGURE 2, with its axis between the positive pole and the axis of the friction plates. Note that in FIGURE 3 $e$ is taken as positive because the friction plate axis $A$ is between the rotor axis $O$ and the positive pole $B_0$.)

$s$ = the distance $AB$ $\phi$=the angle AOB=the rotor angle
$\psi$=the angle $B_oAB$
$\epsilon$=the angle ABO
$\alpha$=the angle between the line OB and the plane of symmetry of a roller
$\omega$=the angular velocity of the rotor $$= \frac{d\varphi}{dt} = \dot\varphi$$

It will now be shown how the axis of rotation of any roller element should be oriented in relation to radius vector OB to enable the roller, at any rotor angle $\phi$, to roll on the frictional surface that it is engaging without any component of sliding motion between the roller and the friction plate in a direction parallel to the roller axis. In other words, it is sought to show what magnitude the angle $\alpha$ must have as a function of the angle $\phi$, or other possibly relevant parameters, in order that the plane of symmetry of the roller shall always be parallel to the instantaneous direction of relative motion between the roller and the point on the friction surface that the roller is engaging.

For this purpose there has been inserted in FIGURE 3 the motion vector $r\omega$ for the point B, and also the motion vector of the friction surface at the instantaneous contact point of the roller thereagainst, the value of the last mentioned vector being given by $$r\omega \cdot \frac{s}{r-e}$$

The vector difference between said vectors is equal to the relative motion vector $\Delta v$. For all relative motion between the roller and the friction plate to be accommodated by rolling motion of the roller, without any sliding of the roller over the friction surface, the direction of vector $\Delta v$ must be parallel to the plane of symmetry of the roller, or in other words perpendicular to the roller axis.

From FIGURE 3 the following equations are obtained:

$$\frac{\sin(90°-\alpha-\epsilon)}{r\omega} = \frac{\sin(90°-\alpha)}{\frac{r\omega s}{r-e}} \quad \ldots (1)$$

$$\frac{\sin \psi}{r} = \frac{\sin \epsilon}{e} \quad \ldots (2)$$

$$\frac{\sin \epsilon}{e} = \frac{\sin \varphi}{s} \quad \ldots (3)$$

$$\psi = \varphi - \epsilon \quad \ldots (4)$$

From Equation (1):

$$\cos(\epsilon+\alpha) = \frac{r-e}{s} \cdot \cos \alpha$$

which gives $$\tan \alpha = \cot \epsilon - \frac{r-e}{s \sin \epsilon} \quad \ldots (5)$$

From Equations (2) and (4):

$$\frac{r}{e} = \frac{\sin(\varphi+\epsilon)}{\sin \epsilon}$$

or $$\cot \epsilon = \left(\frac{r}{e} - \cos \varphi\right) \cdot \frac{1}{\sin \varphi} \quad \ldots (6)$$

If Equation (6) is inserted into Equation (5), there is obained, by means of Equation (3):

$$\tan \alpha = \left(\frac{r}{e} - \cos \varphi - \frac{r-e}{e}\right) \cdot \frac{1}{\sin \varphi} = \frac{1-\cos \varphi}{\sin \varphi} = \tan \frac{\varphi}{2}$$

Hence $$\alpha = \frac{\varphi}{2}(\pm 180°) \quad \ldots (7)$$

This means that the desired conditions for non-sliding rolling are satisfied if the angle $\alpha$ is always equal to half the angle $\varphi$, independently of the eccentricity $e$ (the distance between the rotor and friction plate axes) or other parameters.

From FIGURE 3 there is obtained by means of Equation (7):

$$\angle OBB_o = \angle BB_oO = 90° - \frac{\varphi}{2} = 90° - \alpha$$

This means that the plane of symmetry of every roller must always form an angle of 90° to the line $BB_o$ or in other words that all of the axes of the rollers must always intersect a line which extends through the positive pole $B_o$ of the rotor and which is parallel to the rotor and friction plate axes. The plane of symmetry of every roller will concomitantly intersect the negative pole $B_{180°}$ of the rotor. Note again that the two poles do not partake of the rotation of the rotor or the friction plates but are points in the system that are fixed with respect to the frame. However, if the eccentricity $e$ of the rotor is changed, to effect change in the speed ratio being provided by the apparatus, the poles are carried along with the rotor in its translatory motion, since the poles always lie on the orbit of the roller carrier axes.

As the input shaft 8 rotates, and the friction plates 6 and 7 rotate in unison with it, the rotor 9 is caused to rotate by the tangential friction forces on its rollers which are produced as a result of the roller elements being clamped between the friction surfaces of said plates under the biasing force of spring 13. It will be apparent that torque transmission from the rotor to the friction plates can take place in the same manner, and that the friction plates can drive the rotor or the rotor drive the friction plates in either direction of rotation.

The following designations are now employed in discussing the functioning of the apparatus of this invention:

$u$=the speed ratio of the apparatus, i.e., output r.p.m./input r.p.m.
$e_{max}$=largest value to which $e$ can be adjusted
$e_{min}$=smallest value to which $e$ can be adjusted
$u_{max}$=largest value to which $u$ can be adjusted
$u_{min}$=smallest value to which $u$ can be adjusted
$U = u_{max}/u_{min}$ $\ldots (8)$ The quotient U is a very important quality factor in any variable ratio speed changing device. If U is only slightly above 1 the utility of the device is limited.

The following relationships obtain generally in all embodiments of the invention:

$$u = \varphi/\dot\psi = \frac{r-e}{r} \quad \ldots (9)$$

$$u = 1 - \frac{e}{r}$$

$$u_{min} = 1 - \frac{e_{max}}{r} \quad \ldots (10)$$

$$u_{max} = 1 - \frac{e_{min}}{r} \quad \ldots (11)$$

In the embodiment of the invention shown in FIGURES 1 and 2 the following relationships obtain:

$$e_{min} = -e_{max} \quad \ldots (12)$$

$$U = \frac{1+e_{max}/r}{1-e_{max}/r} = \frac{r+e_{max}}{r-e_{max}} \quad \ldots (13)$$

By a proper dimensioning of components in the embodiment of the invention illustrated in FIGURES 1 and 2, values of the ratio $e_{max}/r$ can be obtained that are between 0.3 and 0.4. At, for example, $e_{max}/r = 0.35$, there is obtained, according to Equations (10), (11), (12) and (13):

$$u_{min} = 0.65; \quad u_{max} = 1.35; \quad U = 2.1$$

Because the roller carriers are so rotated as to at all times maintain the axis of each roller element at its proper phase angle, each roller contributes to the transmission of torque from the input shaft to the output shaft except the rollers at the negative pole of the rotor, i.e., the rollers in a roller carrier that has reached the point in its orbit designated by $\varphi=180°$. As appears from Equation (7) above, the angle $\alpha$ for the rollers at the negative pole will be 90°, i.e. their plane of symmetry is normal to the radius vector OB, and hence all of the forces of reaction between the friction plates and rollers at the negative pole are in the direction to effect rotation of said rollers, without imposing upon them any component parallel to their axes.

The friction that each roller contributes to the coupling between the rotor and the friction plates varies with the angle $\alpha$, and it can be shown that the total friction moment transferred is equal to $$\epsilon M_{\text{friction}} = \frac{2}{\pi}\mu r p_{ax}$$

per friction surface, where $\mu=$ the friction coefficient and $p_{ax}=$ the total force with which the rollers are pressed against the friction surface in the direction normal thereto.

The foregoing assumes that the total axial force $p_{ax}$ is equally distributed among the rollers, which requires that the orbits of the roller elements lie wholly within the limits of the frictional surfaces with which they cooperate, or in other words that each roller element be in engagement with its cooperating frictional surface at all points in its orbit. Upon that assumption, each roller will deliver, on an average throughout each rotor revolution, 64% of its friction force in the useful direction, i.e., tangentially to its orbit.

Figure 4:
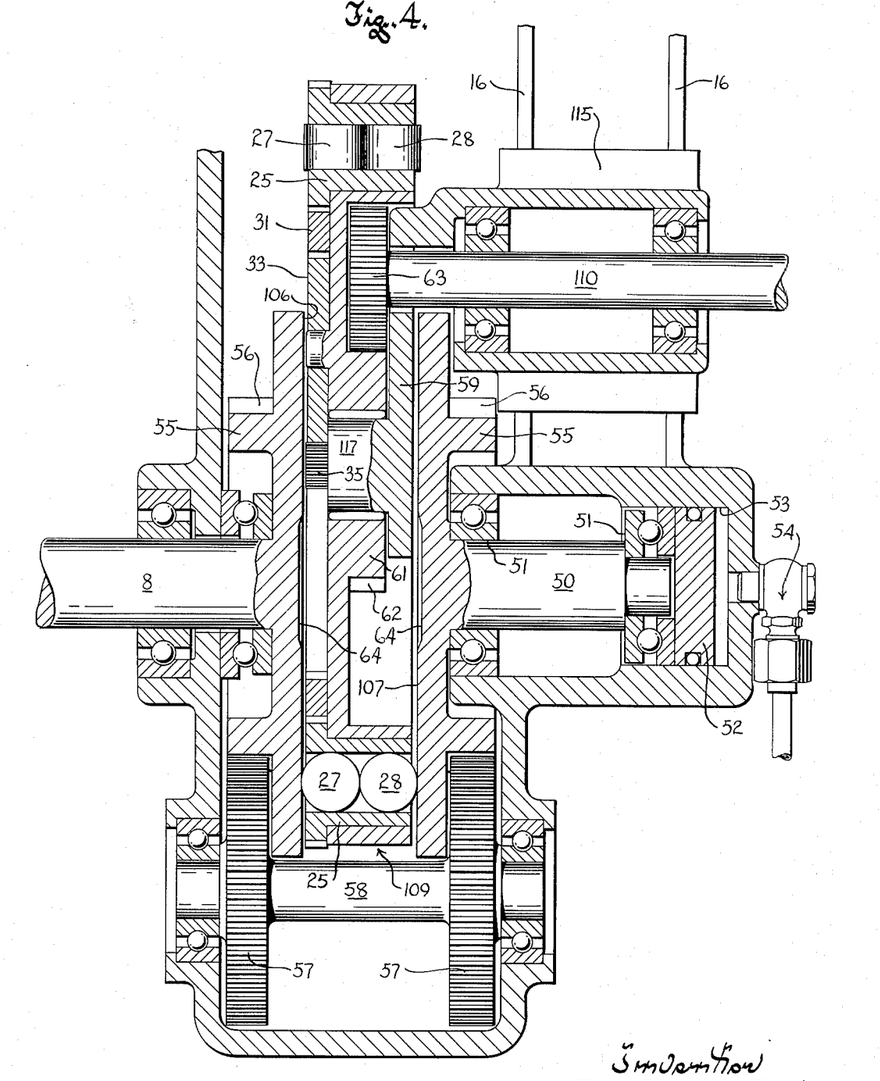
FIGURE 4 is a view generally similar to FIGURE 1 but illustrating a modified embodiment of the invention.

In the modified embodiment of the invention illustrated in FIGURE 4 the speed ratio of the device can be varied between a positive value $u_{\max}$ and a negative value $u_{\min}$, through a range of values that includes zero. However $u_{\max}$ will have a value which is less than 1, and which is in the neighborhood of 0.6 to 0.7. Although the roller elements in the FIGURE 4 embodiment are out of engagement with the friction plates during a portion of their orbit, no substantial decrease in ability to transmit torque results from this fact because the disengagement of the rollers from the friction plates occurs when the rollers are in the vicinity of the negative pole, where they produce only a very small component of friction in the useful direction.

The friction plates 106 and 107 in the FIGURE 4 embodiment are mounted in a frame 105 for coaxial rotation, the front plate 106 being secured to the rear end of the forwardly projecting input shaft 8 and the rear plate 107 being journaled on a coaxial rearwardly projecting stub shaft 50 which is received in bearings 51 in the frame by which the stub shaft is carried for limited axial motion as well as for rotation. A piston 52, slidable in a hydraulic cylinder 53 formed in the rear portion of the frame coaxially with the stub shaft 50, applies forward bias to the stub shaft in response to the pressure of hydraulic fluid (or compressed air) brought to the cylinder from a suitable source by means of a connection 54. To constrain the two friction plates 106 and 107 to rotate in unison, each has a concentric hub-like portion 55 on which radial gear teeth 56 are formed, and a pair of idler gears 57, secured to a common shaft 58 that is journaled in the frame, mesh with the teeth on the two friction plates.

The rotor 109, which is substantially identical with the rotor 9 in the previously described embodiment of the invention, is confined between the two friction plates 106 and 107, and its roller elements 27 and 28 are maintained in frictional engagement with the plates under the biasing force exerted by the piston 52. The rotor is journaled on a stub shaft 117 which projects from a bracket 59 on a carriage 115. The carriage, which is mounted on rails 16, carries the rotor for adjusting motion in opposite directions transverse to its axis. Stationary gear teeth 35, formed on the stub shaft 117, effect rotation of the roller carriers or sleeves 25 in the rotor through a pinion 33 and ring gear 31, as in the previously described embodiment of the invention. The main difference between the rotor 109 of FIGURE 4 and that in the previously described embodiment of the invention is that rotor 109 has a coaxial rearwardly projecting hub portion 61 that is provided with radial gear teeth 62 around its circumference, which teeth mesh with a spur gear 63 fixed to an output shaft 110 that is journaled in the carriage 115.

Adjustment of the carriage 115 along the fixed rails 16 permits the eccentricity $e$ to be varied between about $.4r$ and about $1.2r$. From Equations (10) and (11) it is therefore apparent that:

$$u_{\min}=-0.2;\ u_{\max}=0.6;\ U=-\text{ through }\pm\infty$$

At the position of the carriage at which $e=r$, with the positive pole $B_0$ of the rotor on the axis of the friction plates 106 and 107, $u=0$ and the rotor remains stationary at all speeds of the plates. To prevent wear on whatever roller elements happen to have come to the positive pole position, the friction surface of each plate is somewhat relieved or recessed at its central portion, as at 64.

Utilizing the principles of the invention it is possible to connect a plurality of rotors in parallel, for rotation in unison, and to have them cooperate with friction plates that are similarly connected in parallel, to thus substantially increase the moment of the frictional connection between the driving and driven members of the apparatus without greatly increasing its overall bulk.

By connecting rotors in series, two important advantages can be gained without greatly increasing the size of the apparatus. First the overall range of speed ratios of the device increases, inasmuch as U increases to the square of the value of U for one of the rotors. Secondly, both the output shaft and the input shaft can have their axes fixed with respect to the frame, although it is still necessary to provide some sort of movable carriage or cradle that provides for adjustment of the eccentricity $e$.

Figure 5:
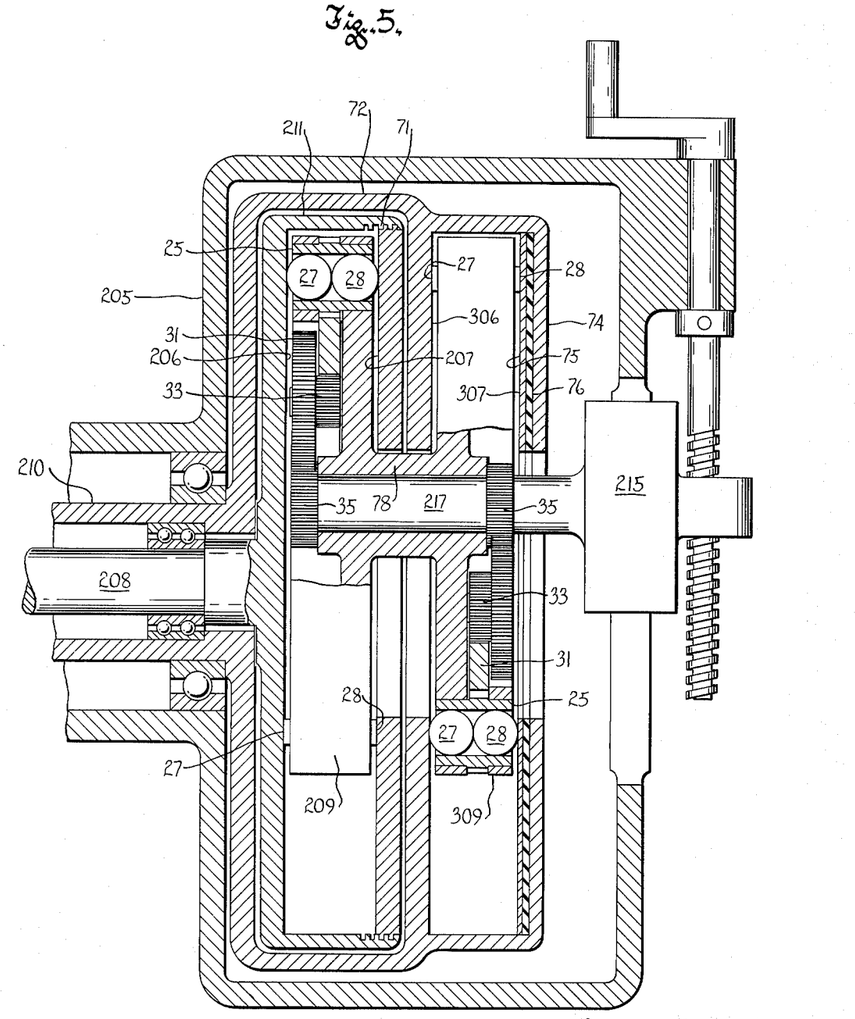
FIGURE 5 is likewise similar to FIGURE 1, but illustrates a further modified embodiment of the invention.

FIGURE 5 is illustrative of how two rotors 209 and 309 can be coupled in series in a device embodying the principles of the invention. In this case the output member 210 is a tubular shaft or sleeve which coaxially and rotatably surrounds the input shaft 208, the two shafts being journaled in a frame 205. Coaxially fixed to the input shaft 208 for rotation therewith is an inner cup-shaped member 211, the front wall of which provides a front friction plate 206 for the front rotor 209. The rear friction plate 207 for the front rotor has a threaded connection 71 with the side wall of the cup-shaped member 211, near the rear thereof, the direction of the thread being such that the torque reaction between the rotor and the plate 207 tends to move the latter forwardly, thus providing clamping bias by which the friction plates 206 and 207 are maintained in engagement with the roller elements 27 and 28 of the front rotor 209.

An outer cup-shaped carrier member 72, coaxially secured to the output shaft 210 for rotation therewith and surrounding the inner cup-shaped member 211, projects behind the latter and carries a rear set of front and rear friction plates 306 and 307, which cooperate with the rear rotor 309. In this case the front friction plate 306 of the rear set comprises an annular wall fixed in the outer cup-shaped member, spaced from the rear edge thereof, while the rear friction plate 307 of the rear set comprises a rigid annular wall 74 fixed to the side wall of the outer cup-shaped extension 311 near the rear thereof. Overlying the rear wall 74 at the front face thereof is a friction member 75, which may be similar to a conventional clutch plate, and between this friction member and the rigid rear wall there is a backing layer 76 of rubber, neoprene or similar resilient material which, by reason of its resilience, provides the necessary axial bias to maintain the rear rotor 309 in clamping frictional engagement with its cooperating friction plates 306 and 307.

It will be understood that in an actual device embodying the principles of this invention as illustrated in FIGURE 5, the same type of biasing means would probably be applied to the rear friction plates 207 and 307 of both sets; that is, either the threaded connection 71 would be used for both rear friction plates or the resilient backing layer 76 would be used on both rear friction plates. The showing of the two different types of biasing means in FIGURE 5 is merely illustrative of various possibilities, since a biasing spring similar to that show in FIGURE 1 might also be employed, although at some sacrifice of compactness. It will also be understood that the threaded connection 71 is merely illustrative of a type of biasing means (other examples of which will be familiar to those skilled in the art) whereby torque reaction between a frictional element (friction plate or rotor) and a shaft or other rotatable member with which the frictional element is coupled is translated into an axial bias on the frictional element.

The front and rear rotors 209 and 309 are constrained to rotate in unison by reason of their both being fixed to a sleeve 78 which is rotatably journaled on a stub shaft 217, said stub shaft in turn being mounted on a carriage 215 by which the rotors can be adjustingly translated in directions transverse to their axis, as in the previously described embodiments of the invention.

Also as in previously described embodiments of the invention, fixed teeth 35 on the stub shaft 217 cooperate with a pinion 33 and a ring gear 31 on each rotor to effect rotation of the roller carriers 25 at one-half the rotor speed and in a direction of rotation relative to the rotor that is opposite to the direction in which the rotor turns. However, it is important that the rotors be so arranged on the sleeve 78 that their positive poles are 180° apart. Hence it will be seen that the front set of friction plates 206 and 207 drives the front rotor 209 at a speed ratio $u$ that depends upon the eccentricity $e$ to which the rotors are adjusted, and the rear rotor, in turn, drives the rear set of plates 306 and 307 with the same speed ratio $u$ between it and said plates. The speed ratio between the two shafts 208 and 210 is thus $u^2$.

Figure 6:
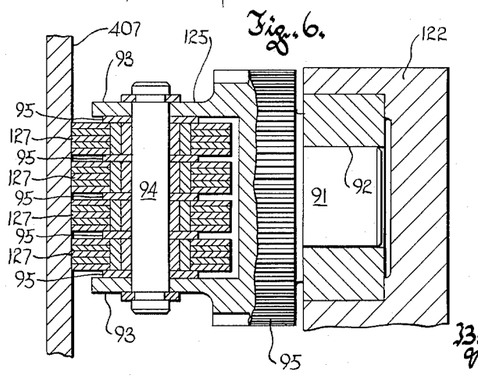
FIGURE 6 is a fragmentary longitudinal sectional view through the rotor and friction plate of another modified embodiment of the invention.

It will be apparent that the principles of this invention can be embodied in a variety of different structural arrangements, so that variable speed ratio transmissions of this invention are adaptable to widely different installation requirements. FIGURE 6 illustrates a modified form of roller carrier 125 which extends the possibilities for structural modification beyond those suggested by the previously described embodiments of the invention, in that it permits the rotor to cooperate with only a single friction plate 407. The roller carrier 125 has a coaxial journal portion 91 at its rear that is received in bearings 92 which are carried by the rotor body 122 and which are capable of supporting both rotation and rearward thrust. At its front the roller carrier 125 is bifurcated to provide a pair of forwardly projecting legs 93 which are equispaced from the roller carrier axis and which cooperate in supporting a roller shaft 94 that has its axis transverse to, and intersecting, the axis of the roller carrier. A plurality of identical roller elements 127 are freely rotatably mounted on the shaft 94, and are of course in peripheral engagement with the friction surface of the single friction plate 407 that cooperates with the rotor.

Surrounding the medial portion of the roller carrier 125, between its journal portion 91 and its bifurcated front end, is a ring of radially projecting spur gear teeth 95 which cooperate with suitable gearing (not shown) on the rotor by which rotation of the roller carrier relative to the rotor is effected in accordance with the principles of this invention as described above. Any suitable means may be employed for imposing axial bias either upon the friction plate 407, to urge it toward the rotor, or upon the rotor to urge it toward the friction plate, or even upon the roller carriers, assuming that both the rotor body and the friction plate are constrained against axial motion so that the rotor body can receive the reaction of the biasing force upon the roller carriers.

Bearing in mind that all of the roller elements 127 along the shaft 94 are engaging portions of the friction plate 407 that are moving at different velocities, it will be apparent that there should be, as shown, several rollers 127 along the length of the shaft, each of small axial length. To permit the several rollers to be capable of free and substantially frictionless rotation relative to one another, thus accommodating the differing angular velocities of the rollers, suitable antifriction washers 95 are interposed between each pair of adjacent rollers along the shaft.

In this instance the rollers are shown as formed of a high friction material, while the friction plate 407 is made of relatively hard metal; but it will be understood that this relationship could be reversed, the rollers being made of hard metal and the plate 407 being provided with a suitable friction facing.

From the foregoing description taken together with the accompanying drawings it will be apparent that this invention provides a variable ratio transmission having a continuously variable range of speed ratios and which is compact, light in weight, relatively very efficient, and capable of being embodied in many different structural forms adaptable to different types of installation requirements and environments. It will also be apparent that the variable ratio transmission of this invention is capable of providing a wide range of speed ratios, including variation from positive, through zero, to negative speed ratios; that it can be driven in either direction of rotation; and that either of its shafts is available to serve as an input shaft while the other serves as an output shaft.

What is claimed as my invention is:

1. Adjustable speed change apparatus providing a continuously variable range of speed ratios between a rotatable driving member and a rotatable driven member, said apparatus comprising:
   (A) a plate connected to one of said members to rotate coaxially therewith and having a friction face normal to its axis;
   (B) a rotor connected to the other of said members to rotate coaxially therewith;
   (C) means mounting said members with their axes parallel to one another and for translatory motion of one of said members transversely to its axis in opposite directions toward and from the axis of the other member;
   (D) a plurality of roller carriers, each having an axis of rotation;
   (E) means mounting said roller carriers on the rotor
      (1) for rotation of each roller carrier about its own axis and relative to the rotor, and
      (2) for orbital motion of the roller carriers with the rotor, said roller carriers being disposed with their axes
         (a) parallel to that of the rotor,
         (b) equidistant from the rotor axis, and
         (c) circumferentially spaced from one another;
   (F) roller means carried by each of the roller carriers for rotation and orbital motion therewith, said roller means also being rotatable relative to the roller carrier about an axis fixed in the roller carrier and normal to the roller carrier axis;
   (G) means maintaining said roller means peripherally engaged under bias with the friction face of the plate; and
   (H) means for rotating each roller carrier relative to the rotor at an angular velocity which is one-half that of the rotor, and in a direction opposite to the direction of rotation of the rotor, with the roller carriers so oriented that the axes of all of the roller means at all times intersect at a point lying on a plane that is on the axes of the rotor and the plate.

2. In a transmission of the character described, providing a frictional coupling between rotatable driving and driven members:
  (A) a friction element connected to one of said members to rotate therewith and having a friction face a normal of which constitutes its axis of rotation;
  (B) a rotor body connected to the other of said members to rotate about its axis with said other member;
  (C) means mounting said friction element and said rotor body with their axes being maintained in a common plane;
  (D) a plurality of roller carriers, each having an axis of rotation;
  (E) means mounting said roller carriers on the rotor body
    (1) for rotation about their axes relative to the rotor body and
    (2) for orbital motion with the rotor body, the axes of the roller carriers being
      (a) normal to the adjacent part of the friction face,
      (b) radially spaced from the rotor body axis,
      (c) circumferentially spaced from one another;
  (F) a number of roller elements carried by each roller carrier for rotation and orbital motion therewtih, and for revolution relative to the roller carrier about an axis fixed in the roller carrier, said roller element being disposed for peripheral engagement with the friction face on said friction element; and
  (G) means for rotating each roller carrier relative to the rotor body such that at one point in the orbit of each roller carrier the axis of its roller element lies on the plane defined by the axes of the rotor body and friction elements.

3. In a variable speed ratio transmission of the character described:
  (A) a friction element having a flat face;
  (B) a rotor body;
  (C) means comprising a frame
    (1) mounting the friction element for rotation about an axis normal to said flat face thereof and
    (2) mounting the rotor body for rotation about an axis which is at all times parallel to that of the friction element,
    (3) said means providing for relative motion in opposite directions between the friction element and the rotor body by which their axes are translated relatively toward and from one another;
  (D) a plurality of roller carriers;
  (E) roller means carried by each roller carrier for rotation about an axis fixed in the roller carrier;
  (F) means mounting the roller carriers on the rotor body
    (1) for rotation of each roller carrier relative to the rotor body about an axis which is parallel to the rotor body axis,
    (2) and for orbital motion of the roller carriers with the rotor body, the rotational axes of the roller carriers being equidistant from the rotor body axis and circumferentially spaced from one another,
    (3) said mounting means disposing the roller means for peripheral engagement under bias with the flat face of the friction element;
  (G) means for so orienting the roller carriers that the rotational axes of all of the roller means intersect one another on a plane which is on the axes of the rotor body and the friction element; and
  (H) means for rotating each roller carrier about its axis, relative to the rotor body,
    (1) in a direction opposite to the direction of rotation of the rotor body and
    (2) at one-half the angular velocity of the rotor body
  to thus maintain said orientation of all of the roller carriers at all points in their orbital motion.

4. In a variable speed ratio transmission of the character described:
  (A) a friction element having a flat face;
  (B) a rotor body;
  (C) means comprising a frame
    (1) mounting the friction element for rotation about an axis normal to its flat face and
    (2) mounting the rotor body for rotation about an axis which is at all times parallel to that of the friction element,
    (3) said means providing for relative motion in opposite directions between the friction element and the rotor body by which their axes are translated relatively toward and from one another;
  (D) a roller element which stereometrically is a rotation generated body;
  (E) means mounting the roller element on the rotor body for revolution about its rolling axis relative to the rotor body,
    (1) with the rolling axis of the roller element parallel to said face of the friction plate and the roller element disposed for peripheral engagement with said face,
    (2) and with a point in the roller element on its axis spaced from the rotor body axis so that the roller element is carried in orbital motion by rotation of the rotor body,
    (3) said last named means providing for turning of the roller element axis, relative to the rotor body, about a turning axis which is parallel to the rotor body axis and extends through said point; and
  (F) means for turning the roller element about said turning axis
    (1) at an angular velocity which is one-half that of the rotor body and
    (2) in a direction opposite to the direction of rotation of the rotor body,
    (3) said last named means maintaining the rolling axis of the roller element so oriented that at one point in every orbit of the roller element it intersects on the axis of both the friction element and the rotor body.

5. Adjustable speed change apparatus providing a continuously variable range of speed ratios between a rotatable driving member and a rotatable driven member, said apparatus comprising:
  (A) a frame by which said driving and driven members are carried for rotation;
  (B) a carriage mounted on said frame for motion in opposite directions along a defined path;
  (C) a rotatable friction element having a substantially flat surface normal to its rotational axis;
  (D) a rotor element;
  (E) means on the frame mounting one of said elements for rotation with its axis fixed and transverse to the path of carriage motion;
  (F) means on the carriage mounting the other of said elements for rotation with its axis parallel to that of the first designated element and for bodily motion with the carriage to carry its axis toward and from that of said first designated element;
  (G) means providing a rotation transmitting connection between each of said elements and one of said members;
  (H) a plurality of roller carriers each having an axis of rotation;
  (I) means mounting said roller carriers on the rotor element
    (1) for rotation of each roller carrier about its own axis relative to the rotor element, and (2) for orbital motion of the roller carriers with the rotor element, said roller carriers being disposed with their axes
    (a) parallel to that of the rotor element,
    (b) equidistant from the rotor element axis, and
    (c) circumferentially spaced from one another;

(J) roller means carried by each of the roller carriers for rotation about a rolling axis which is fixed in the roller carrier and is normal to the roller carrier axis, said roller means being disposed for peripheral engagement with said flat surface on the friction element; and (K) means for rotating each roller carrier relative to the rotor element at an angular velocity which is one-half that of the rotor element and in a direction opposite to the direction of rotation of the rotor element, said last named means maintaining the roller carriers so oriented that at one point in the orbit of every roller carrier the axis of its roller means lies on the plane defined by the axes of the rotor and friction elements.

6. The apparatus of claim 5, wherein said means mounting the rotor element for rotation comprises a nonrotatable shaft coaxial with the rotor element, further characterized by the fact that said last named means (element K) for rotating each roller carrier comprises:
(A) a coaxial ring of gear teeth fixed on said nonrotatable shaft;
(B) a coaxial ring of gear teeth on each roller carrier;
(C) a stub shaft eccentrically mounted on the rotor element;
(D) a pinion rotatable on said stub shaft and meshing with the gear teeth on said nonrotatable shaft; and
(E) a ring gear concentric with the rotor element and rotatable relative thereto, said ring gear having
    (1) internal gear teeth meshing with the pinion and
    (2) external gear teeth meshing with the rings of gear teeth on the roller carriers.

7. The apparatus of claim 5, further characterized by the following:
(A) the roller means carried by each roller carrier comprises a pair of cylinders;
(B) each of the roller carriers has an axial bore therethrough of substantially rectangular cross section in which said cylinders are received with their axes spaced apart along the roller carrier axis, and by which said cylinders are constrained against movement in directions transverse to the axis of rotation of the roller carrier;
(C) a second frictional element
    (1) is mounted for rotation coaxially with the first designated frictional element,
    (2) is constrained to rotation in unison therewith, and
    (3) has a flat surface normal to its axis which opposes said flat surface on the first designated friction element; and
(D) biasing means urges one of said friction elements axially toward the other, to thus maintain one cylinder of each roller means peripherally engaged with one friction element, the other cylinder of each roller means peripherally engaged with the other friction element, and the two cylinders comprising each roller means peripherally engaged with one another.

References Cited by the Examiner

UNITED STATES PATENTS

| | | | |
|---|---|---|---|
| 1,470,564 | 10/23 | Hall | 74—112 |
| 1,716,952 | 6/29 | Ditsheim | 74—112 |

BROUGHTON G. DURHAM, *Primary Examiner.*

UNITED STATES PATENT OFFICE
CERTIFICATE OF CORRECTION

Patent No. 3,202,019                      August 24, 1965

Per Torsten Faxén

It is hereby certified that error appears in the above numbered patent requiring correction and that the said Letters Patent should read as corrected below.

Column 5, equation "(4)" should appear as shown below instead of as in the patent:

$$\psi = \varphi + \varepsilon$$

column 7, line 11, after "friction" insert -- force --; column 8, line 14, in the equation, before "through" insert -- 3 --; column 11, line 26, for "therewtih" read -- therewith --.

Signed and sealed this 19th day of April 1966.

(SEAL)
Attest:

ERNEST W. SWIDER                      EDWARD J. BRENNER
Attesting Officer                        Commissioner of Patents